United States Patent
Pewett et al.

(10) Patent No.: US 11,549,411 B2
(45) Date of Patent: Jan. 10, 2023

(54) OIL DRAINING SYSTEM

(71) Applicant: TDNT ENTERPRISE INC., Batavia, IL (US)

(72) Inventors: Trevor J. Pewett, Batavia, IL (US); Dave Gregerson, Lawrenceville, GA (US)

(73) Assignee: TDNT ENTERPRISE INC., Batavia, IL (US)

( * ) Notice: Subject to any disclaimer, the term of this patent is extended or adjusted under 35 U.S.C. 154(b) by 252 days.

(21) Appl. No.: 16/946,576

(22) Filed: Jun. 26, 2020

(65) Prior Publication Data

US 2021/0404354 A1 Dec. 30, 2021

(51) Int. Cl.
 F01M 11/04 (2006.01)
 B01D 35/16 (2006.01)
 B01D 35/00 (2006.01)

(52) U.S. Cl.
 CPC ....... F01M 11/0458 (2013.01); B01D 35/005 (2013.01); B01D 35/16 (2013.01); *B01D 2201/34* (2013.01)

(58) Field of Classification Search
 CPC ... B01D 35/005; B01D 2201/34; B01D 35/16
 See application file for complete search history.

(56) References Cited

U.S. PATENT DOCUMENTS

| | | | |
|---|---|---|---|
| 2,376,756 A * | 5/1945 | Bye | B67B 7/24 30/446 |
| 4,177,529 A | 12/1979 | Sikula, Jr. | |
| 5,299,714 A | 4/1994 | Kilgore | |
| 5,598,951 A * | 2/1997 | DeBano, Jr. | B67C 11/02 222/88 |
| 5,694,990 A | 12/1997 | Crima | |
| 5,921,292 A | 7/1999 | Fouts | |
| 6,880,252 B1 * | 4/2005 | Drake | B25C 7/00 30/366 |
| 8,651,134 B1 * | 2/2014 | Kurtz | F16N 31/00 141/330 |
| 10,138,773 B2 * | 11/2018 | Dosky | F01M 11/03 |
| 2009/0308464 A1 | 12/2009 | Cesarz | |
| 2012/0267006 A1 | 10/2012 | Liao | |

OTHER PUBLICATIONS

International Search Report and Written Opinion in International Application No. PCT/US2021/039096, dated Sep. 29, 2021 (8 pages).

* cited by examiner

*Primary Examiner* — Kevin A Lathers
(74) *Attorney, Agent, or Firm* — Michael Best & Friedrich LLP (57) ABSTRACT

A system is provided for removing oil from an oil filter of a motor vehicle. The system includes a housing with a top rim, an upper portion, a lower portion, and a bottom rim. The top rim of the housing includes a first diameter. The housing includes the bottom rim with a second diameter that is less than the first diameter. The system also includes an upper cap with a flange including a first side and an opposing second side. The flange is disposed at a top portion of the upper cap. The first side of the flange is coupled to the top rim of the housing. A bottom portion of the upper cap extends into the housing. The upper cap includes a central aperture for draining the oil from the oil filter into the housing.

17 Claims, 7 Drawing Sheets

OIL DRAINING SYSTEM

FIELD OF THE INVENTION

The present disclosure relates to systems and assemblies for removing oil, and more specifically, to systems and assemblies for removing oil from an oil filter in a motor vehicle.

BACKGROUND

The process of draining oil from an oil filter in a motor vehicle or agriculture equipment may take up an excessive amount of time, not only for an individual changing their own oil, but also for an experienced professional striving for efficiency. The conventional systems and methods for oil change can also cause spills of heated oil, which can potentially cause injury (e.g., due to the heat and material composition of the oil). In addition, coming into contact with heated oil can cause painful burns on the skin. There are also many components involved during an oil change, such as the drain plug, the drain plug seal, the oil filter itself, and the rubber seal that is attached to the top of the oil filter, all of which need to be tracked. Heated oil entering a catch pan may splatter or spill even if a user attempts to direct the oil at the catch pan. Thus, the oil may still burn the skin of the user or create a mess, even if the oil filter was positioned directly above the catch pan.

Additionally, the oil may be difficult to remove from surfaces, especially if the surfaces absorb the oil. Often times, many additional materials such as towels, wipes, and other papers are used to prevent these messes, and to clean after they occur. Time spent on cleaning the area where the oil removal process occurred may also take an excessive amount of time, and the areas can remain tainted with remnants from the oil draining process. This may also produce excess waste due to the cleaning supplies and materials used and disposed.

SUMMARY

The following presents a simplified summary of one or more implementations in order to provide a basic understanding of present technology. This summary is not an extensive overview of all contemplated implementations of the present technology, and is intended to neither identify key or critical elements of all examples, nor delineate the scope of any or all aspects of the present technology. Its sole purpose is to present some concepts of one or more examples in a simplified form as a prelude to the more detailed description that is presented later.

According to some implementations of the present disclosure, a system for removing oil from an oil filter of a motor vehicle or agriculture equipment is disclosed. The system includes a housing, an upper cap, and a lower cap. The housing defines a top rim, an upper portion, a lower portion, and a bottom rim. The top rim has a first diameter. The bottom rim has a second diameter that is less than the first diameter. The upper cap includes a flange with a first side and an opposing second side. The flange is disposed at a top portion of the upper cap. The first side of the flange is coupled to the top rim of the housing. The second side of the flange is couplable to the oil filter. A bottom portion of the upper cap extends into the housing. The upper cap includes a central aperture for draining the oil from the oil filter into the housing. The lower cap is coupled to the bottom rim of the housing.

In some implementations, the upper portion of the housing defines a taper, from the top rim toward the lower portion of the housing. The lower portion of the housing is generally cylindrical.

In some implementations, the upper portion of the housing includes a hollow conical frustrum. The lower portion of the housing includes a hollow cylinder with open ends. The hollow cylinder extends below the conical frustrum of the upper portion of the housing.

In some implementations, the second side of the upper cap is concave for directing the oil from the oil filter toward the central aperture of the upper cap.

In some implementations, the system further includes a puncture device removably coupled to the lower cap. At least a portion of the puncture device extends through the lower cap into a void of the upper cap. In some implementations, the at least a portion of the puncture device includes a drill bit. In some implementations, the lower cap includes an internal seal. The puncture device is configured to penetrate the internal seal of the lower cap and extend into the housing, while substantially being leak-proof between the puncture device and the internal seal of the lower cap. In some implementations, the puncture device is configured to extend further through the upper cap and out of the second side of the upper cap.

In some implementations, the system further includes a hollow tube removably coupled to the lower cap. The hollow tube includes a proximal tip for puncturing the lower cap, thereby allowing removal of the oil from the oil filter. In some implementations, the hollow tube includes a puncture device at a proximal end of the hollow tube. The puncture device is configured to extend through the lower cap.

In some implementations, the lower portion of the housing includes a third diameter that is equal to the second diameter of the bottom rim.

In some implementations, a longitudinal cross-section of the upper cap is generally "T" shaped. In some such implementations, a transverse cross-section of the upper cap is generally "O" shaped.

In some implementations, the system further includes a gasket with a first side and an opposing second side. The first side of the gasket is coupled to the second side of the upper cap. The second side of the gasket is couplable to the oil filter. In some such implementations, the gasket is substantially circular.

According to some implementations of the present disclosure, a system for removing oil from an oil filter of a motor vehicle or agriculture equipment is disclosed. The system includes a housing, an upper cap, and a lower cap. The housing defines a top rim, a body portion, and a bottom rim. The body portion of the housing is generally cylindrical. The upper cap includes a flange with a first side and an opposing second side. The flange is disposed at a top portion of the upper cap. The first side of the flange is coupled to the top rim of the housing. The second side of the flange is couplable to the oil filter. A bottom portion of the upper cap extends into the housing. The upper cap includes a central aperture for draining the oil from the oil filter into the housing. The lower cap is coupled to the bottom rim of the housing.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present disclosure is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As disclosed herein, removing and/or draining oil from an oil filter often causes skin burns and/or excess mess. As a result, many cleaning materials are used, which are disposed of into the environment. Additionally, the process is often time consuming, which can cause delays in other parts of the oil changing process. Desirable aspects of the present disclosure include systems and assemblies that can (i) reduce the number of steps in the oil removal process, and/or (ii) automate the oil removal process. The disclosed systems and assemblies not only save time, but also reduce potential damage and waste resulting from the oil removal and/or draining process. In some implementations, the systems and assemblies described herein (i) reduce time spent in the process, (ii) prevent injury to the users, (iii) protect surface areas in the surroundings, and (iv) are environmentally friendly.

Aspects of the present disclosure include an oil draining system that can provide a user with a tool that removes and/or drains oil without coming into contact with the heated oil. The oil draining system causes little spillage and/or leakage of the heated oil. In some implementations, a user of the oil draining system may be a lay individual who is changing, removing, and/or draining oil from their own vehicle. In some implementations, the user of the oil draining system may have some experience ranging from a new technician to an experienced professional technician.

Thus, the disclosed oil draining system allows a user and their workspace to remain burn-free and cleaner, while still producing the same results of an oil removal process. In some implementations, the oil removal process can optionally include removing and/or draining the oil cap and removing the drain plug. Removing the drain plug may require quick movement into the catch pan underneath the drain plug while the user is under the vehicle, and locating the washer on the drain plug to ensure it is also removed. In some implementations, the catch pan can include, but is not limited to, a container, a bin, a pan, a tray, or a combination thereof.

Furthermore, in some implantations, oil draining system allows the user to avoid the tricky step of applying enough pressure to remove the drain plug, while still keeping enough distance between the user and drain plug, all while ensuring the catch pan is positioned such that the oil being removed and/or drained from the filter is directed at the catch pan before pressure is lifted from the drain plug. The oil draining system allows a user to remove and/or drain the oil from the filter in a way that minimizes risk of being burned by the heated oil. The oil draining system also provides for reduced cleaning time, and an environmentally friendly solution in the clean-up process.

Figure 1:
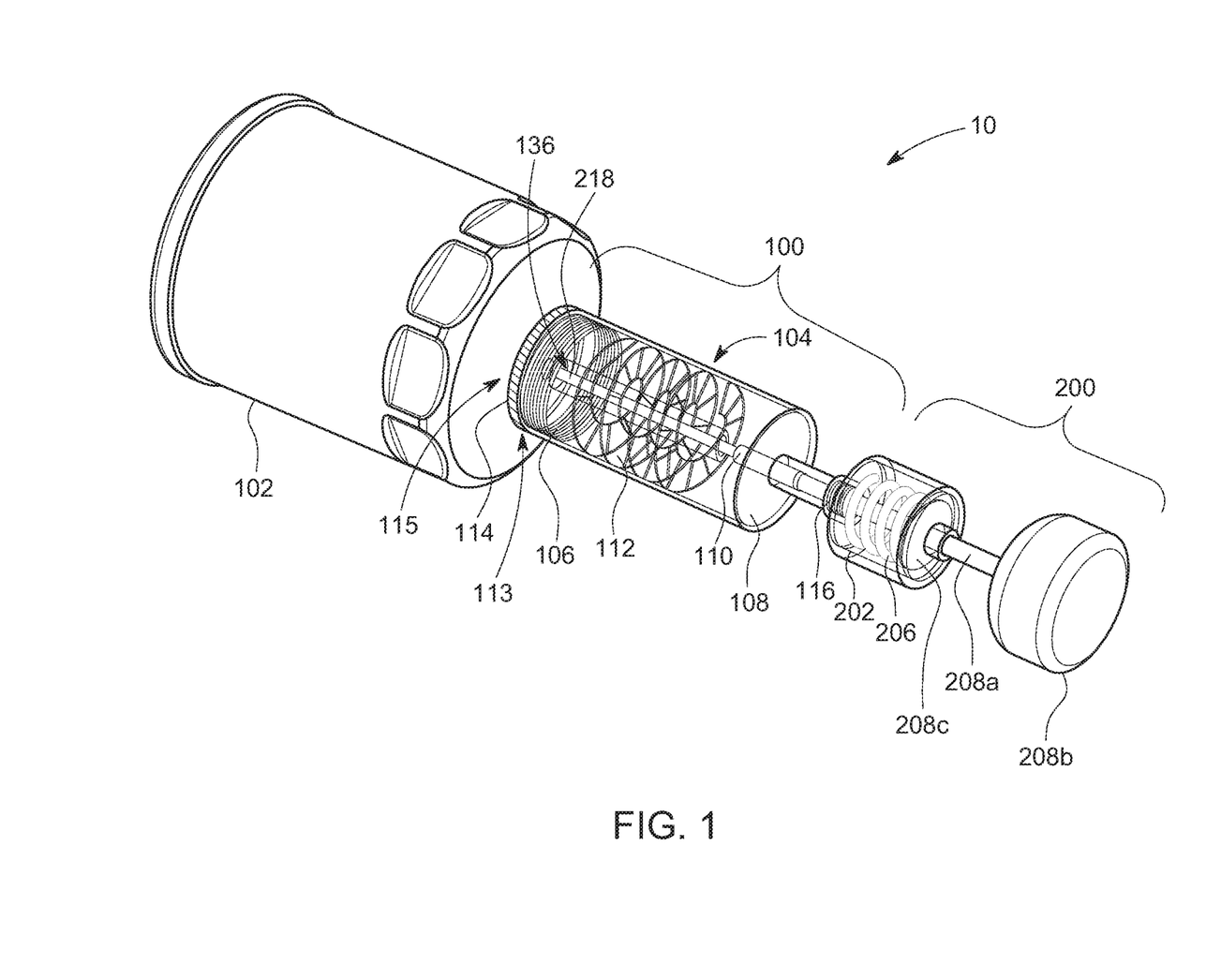
FIG. 1 illustrates an isometric view of a system for removing and/or draining oil from an oil filter, according to some implementations of the present disclosure.

FIG. 1 illustrates an example oil draining system 10 for removing and/or draining oil from an oil filter of a motor vehicle or agriculture equipment, according to some implementations of the present disclosure. The system 10 includes a containment device 100 and a removable puncture assembly 200. In some implementations, the containment device 100 includes a housing 104, an upper cap 106, a lower cap 108, an inner shaft 110, a spiral support 112, a gasket 114, and a seal 116.

The containment device 100 is removably coupled to an oil filter 102 of a vehicle. This connection may be through a temporary and/or removable connection to the oil filter 102, such as suction, magnetic coupling, nuts and bolts, clamps, or another method that temporarily and/or removably couples the containment device 100 to the oil filter 102. In some implementations, a portion of the containment device 100 may encapsulate a portion of the oil filter 102. For example, the portion of the containment device 100 may wrap around the portion of the oil filter 102.

The alignment between the oil filter 102 and the containment device 100 can be determined according to the orientation of the oil filter 102 relative to the direction of gravity. For example, a longitudinal axis through the containment device 100 is preferably along the direction of gravity. As shown, in some implementations, the oil filter 102 and the containment device 100 are aligned, such that the longitudinal axis through the containment device 100 is parallel to a longitudinal axis through the oil filter 102. In some other implementations, the connection between the oil filter 102 and the containment device 100 may be tilted, such that the longitudinal axis through the containment device 100 is at an angle to the longitudinal axis through the oil filter 102.

In some implementations, the containment device 100 may be temporarily and/or removably coupled to a side of the oil filter 102. In some implementations, the containment device 100 may be magnetically coupled to the oil filter 102. In some implementations, the interface of the containment device 100 and the oil filter 102 is sealed using a gasket 114 to prevent leakage in changing, removing and/or draining the oil to avoid unnecessary burns or mess. For example, in some implementations, the gasket 114 is coupled to the upper cap 106 on a first side 113 of the gasket 114, and the gasket 114 is couplable to the oil filter 102 on an opposite side 115 of the gasket 114. In some such implementations, the gasket 114 can include any type of polymer seal, Teflon tape, or both. The gasket 114 may also vary in size. For example, in some implementations, the gasket 114 includes a diameter of 1⅞ inch and a depth of ¹⁄₁₆ inch. In some implementations, the gasket 114 is substantially circular.

The containment device 100 is also temporarily and/or removably coupled to the puncture assembly 200. This connection between the containment device 100 and the puncture assembly 200 can also be substantially sealed to avoid unnecessary burns and/or mess due to potential spilling and/or leaking of oil. The connection between the containment device 100 and the puncture assembly 200 may be made using threads, seals, gaskets, and/or any other mechanism that ensures (i) a removable connection and (ii) a substantially leak-proof seal. For example, the seal 116 of the containment device 100 is capable of providing such a removable and substantially leak-proof connection. The seal 116 may be made of a material the same as, or similar to, the gasket 114 of the containment device 100.

In some implementations, the housing 104 can also include the spiral support 112 and the inner shaft 110. Thus, in some such implementations, the spiral support 112 defines an inner diameter that may allow the inner shaft 110 to fit through the spiral support 112. Additionally, or alternatively, in some such implementations, the inner shaft 110 has an external diameter that is smaller than the inner diameter of the spiral support 112. For example, in some implementations, the inner shaft 110 may include the diameter of ⅛ inch, and a length of 1½ inches.

The spiral support 112 may be in a generally spiral shape, or any shape to induce oil movement within the housing 104 and/or allow for easier passage of the oil. In some implementations, the spiral support 112 may be a mechanism that rotates to promote and/or multiply torque. In some other implementations, the spiral support 112 may be stationary and/or solely provide support to the inner shaft 110 in maintaining its position within the housing 104. In some implementations, the spiral support 112 may be coupled to and/or extend from the inner walls of the housing 104.

In some implementations, the spiral support 112 may include an outer diameter that is the same as, or less than, the inner diameter of the housing 104. For example, in some such implementations, the spiral support 112 may include a diameter of ½ inch, and a length of three inches. The spiral support 112 and the inner shaft 110 may be made of the same or similar material as the housing 104.

In some implementations, the puncture assembly 200 includes an encapsulator 202, a spring 206, a handle shaft 208a, a handle bar 208b, and a handle flange 208c. The encapsulator 202 may be made of the same or similar components as the housing 104. The encapsulator 202 may include any suitable dimensions. For example, in some implementations, the encapsulator 202 includes a diameter of 1⅞ inch, and a length of three inches. The spring 206 may be positioned in an interior of the encapsulator 202. The spring 206 can also include any suitable dimensions. For example, in some implementations, the spring 206 may be a 4-coil spring that is ⅛ inch thick. Thus, in some implementations, when the puncture assembly 200 is coupled to the containment device 100, the seal 116 of the containment device 100 may be positioned between the handle shaft 208a and the inner shaft 110 of the containment device 100.

In some implementations, the puncture assembly 200 is temporarily and/or removably coupled to the containment device 100. In some other implementations, the puncture assembly 200 is semi-permanently coupled to the containment device 100. In some implementations, the handle shaft 208a can fit into the spring 206, and can be coupled to the handle bar 208b. The handle shaft 208a and the handle bar 208b may be made of a polymer or metal similar to the housing 104.

In some implementations, the puncture assembly 200 further includes a puncture device 218. In some such implementations, the puncture device 218 is coupled to and/or integral with the handle shaft 208a. In some implementations, when the puncture assembly 200 is coupled to the containment device 100, at least a portion of the puncture device 218 extends through the seal 116 of the lower cap 108 into a void of the upper cap 106. In some implementations, at least a portion of the puncture device 218 includes a drill bit as the tip. In some other implementations, the handle shaft 208a punctures through the seal 116 of the lower cap 108, such that the handle shaft 208a abuts the inner shaft 110.

In some implementations, the containment device 100 includes the puncture device 218 instead. The puncture device 218 can be coupled to and/or integral with the inner shaft 110 of the containment device 100. In some such implementations, the handle shaft 208a transfers pressure to the inner shaft 110 and/or the puncture device 218, which assists the puncture device 218 in puncturing the oil filter 102. Additionally, or alternatively, the puncture device 218 is coupled to the spiral support 112. In some such implementations, the handle shaft 208a transfers pressure to the spiral support 112, which in turn rotates the puncture device 218 upwards to puncture the oil filter 102.

Figure 2:
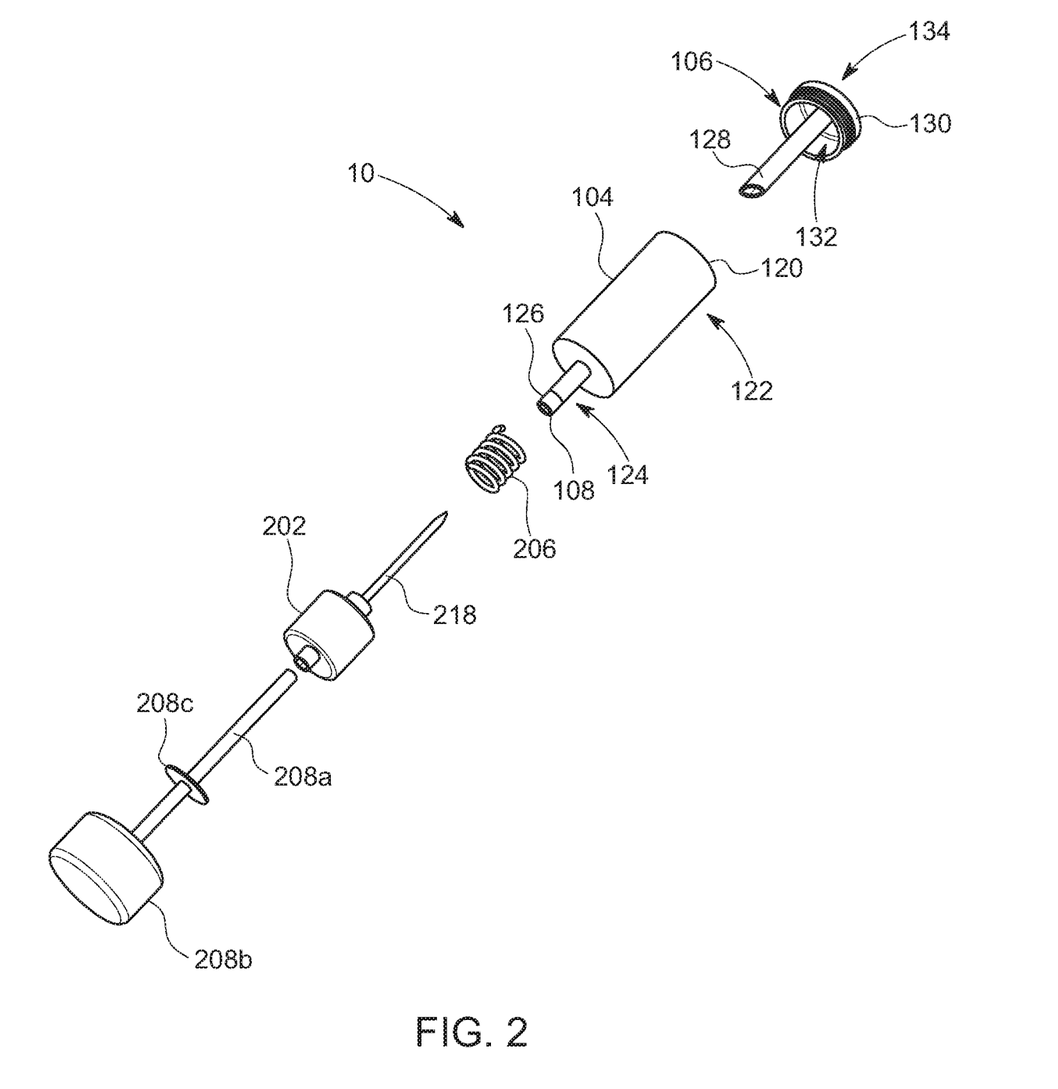
FIG. 2 illustrates an exploded view of the system of FIG. 1, according to some implementations of the present disclosure.
Figure 4:
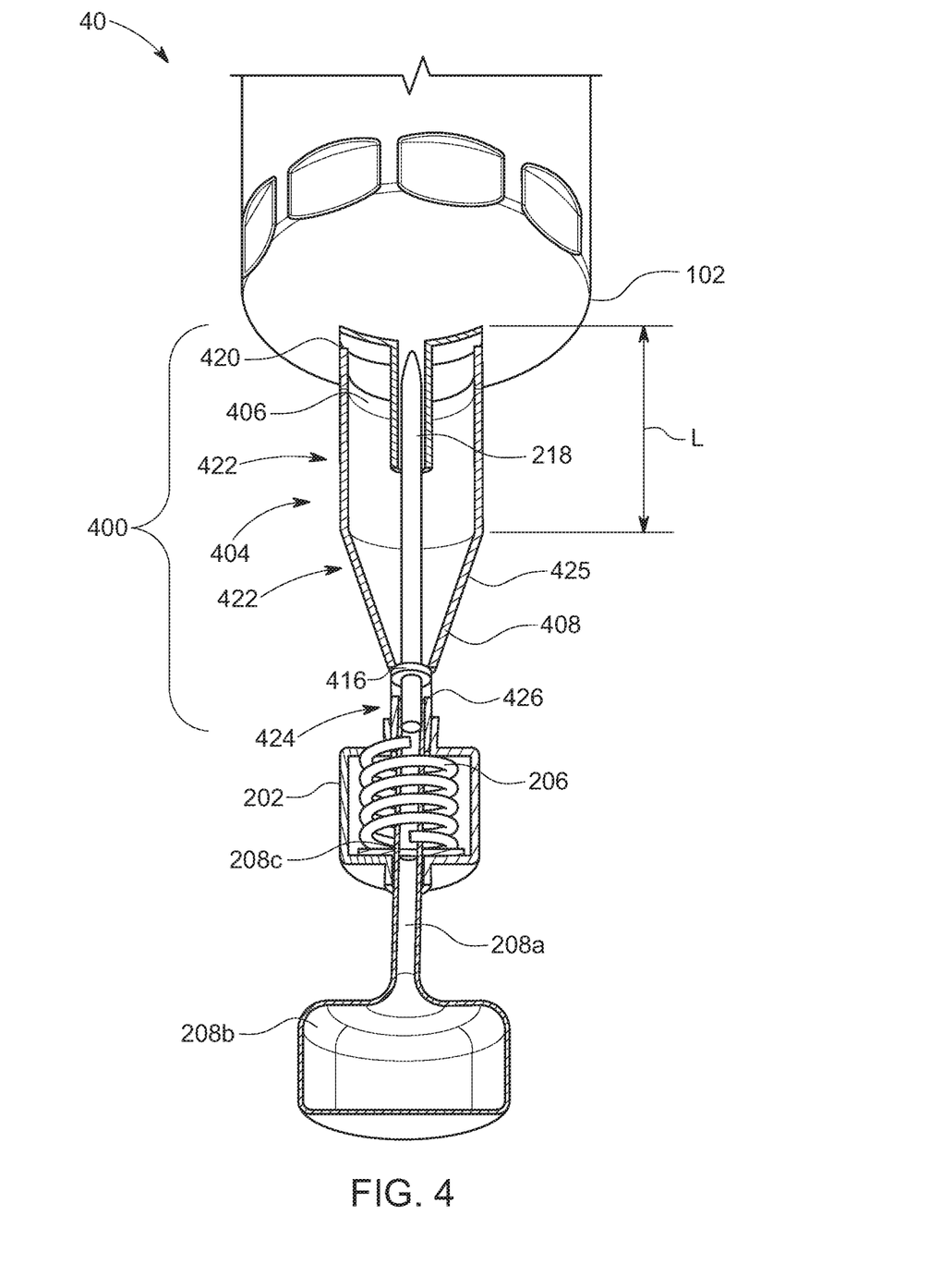
FIG. 4 illustrates a cross-sectional view of an alternative system for removing and/or draining oil from an oil filter, according to some implementations of the present disclosure.

Referring now to FIG. 2, an exploded view of the system 10 is depicted, according to some implementations of the present disclosure. As shown, the housing 104 includes a top rim 120, an upper portion 122, a lower portion 124, and a bottom rim 126. In some implementations, the upper portion 122 of the housing 104 is generally cylindrical. In some other implementations, the upper portion 122 of the housing 104 includes a hollow conical frustum (e.g., the housing 404 as shown in FIG. 4). The lower portion 124 of the housing 104 includes a hollow cylinder with open ends. The lower portion 124 extends below the upper portion 122 of the housing 104.

In some implementations, the diameter and/or width of the housing 104 is greater than the diameter and/or width of the bottom rim 126. Other dimensions of the housing 104 may vary. In some implementations, the lower portion 124 of the housing 104 may include a diameter and/or width that is equal to the diameter and/or width of the bottom rim 126. The housing 104 may be made of metal (e.g., aluminum or steel), a polymer (e.g., polyethylene or polytetrafluoroethylene), or any material capable of withstanding a temperature of at least 230 degrees Fahrenheit, at least 240 degrees Fahrenheit, at least 250 degrees Fahrenheit, or at least 270 degrees Fahrenheit. In some implementations, the housing 104 may include an insulated wall in a double vacuum.

In some implementations, the containment device 100 also includes the upper cap 106 with a flange 130. The flange 130 is disposed at a top portion of the upper cap 106. The flange 130 includes a first side 132 and an opposing second side 134. The first side 132 of the flange 130 may be coupled to the top rim 120 of the housing 104. The second side 134 of the flange 130 may be couplable to the oil filter 102 (FIG. 1). A bottom portion 128 of the upper cap 106 may extend into the housing 104. In some implementations, the upper cap 106 includes a central aperture 136 (FIG. 1) for draining the oil from the oil filter 102 into the housing 104. In some implementations, the second side 134 of the upper cap 106 is concave for directing the oil from the oil filter 102 toward the central aperture 136 (FIG. 1) of the upper cap 106.

In some implementations, the upper cap 106 may include a diameter of two inches, and a height of ¼ inch, with the central aperture 134 of ½ inch in diameter. The upper cap 106 may have two different cross-sections. A first cross-section (e.g., longitudinal cross-section) of the upper cap 106 may be taken as shown in the view depicted in FIGS. 3A-C, and includes a general "T" shape. A second cross-section (e.g., transverse cross-section) of the upper cap 106 may be taken from an angle perpendicular to the first cross-section, along the length of the upper cap 106, and includes a general "O" shape.

In some implementations, the portion of the upper cap 106 that is concentric with the inner shaft 110 may include voids to allow for the passage of oil from the upper cap 106 into the hollow portion of the housing 104. The voids may be any size or shape, so long as the upper cap 106 maintain its semi-rigid structure. In some implementations, the upper cap 106 is couplable to oil filter 102 with or without the gasket 114 in-between. In some implementations, the upper cap 106 is magnetically couplable to a metal oil filter (e.g. the oil filter 102), such that the housing 104 maintains its position as coupled to the oil filter 102 without additional pressure applied by the user (referred to as using a push-button method). In some implementations, where there is the gasket 114 between the oil filter 102 and upper cap 106, the gasket 114 aids in preventing leaks between the oil filter 102 and the upper cap 106.

In some implementations, the lower cap 108 is coupled to the bottom rim 126 of the housing 104. The lower cap 108 may be made with an elastomer or polymer type of material, such as rubber, that sustains its form and may remain liquid tight even if punctured with a sharp item. In some implementations, the lower cap 108 may include the seal 116 as an internal component of the lower cap 108. Thus, in some implementations, the seal 116 may be punctured and reseal upon release.

Additionally, in some implementations, the seal 116 can be reused and maintain its resealing characteristics. For example, in some implementations, the seal 116 can be reused for three times, four times, five times, ten times, or indefinitely. For example, the seal 116 may include a sealing mechanism such that, even after being punctured by the puncture device 218, liquid does not spill and/or leak out of the seal 116 from the interior of the containment device 100, even after the puncture device 218 is removed from the containment device 100 (e.g., the puncture device 218 no longer extends through the seal 116).

In some implementations, the puncture device 218 is configured to penetrate the seal 116 of the lower cap 108, and extend into the housing 104, while substantially being leak-proof between the puncture device 218 and the seal 116 of the lower cap 108. In some implementations, the puncture device 218 is further configured to extend further through the upper cap 106, and out of the second side 134 of the upper cap 106.

Additionally, or alternatively, in some implementations, the internal seal 116 of the lower cap 108 can be reused for at least two times, allowing coupling and decoupling of the puncture device 218. The lower cap 108 may vary in size and/or may be threaded in the center. For example, in some implementations, the lower cap 108 includes a diameter of two inches, and height of ¼ inch, with a ½ inch center hole. In some implementations, the lower cap 108 and/or the seal 116 is replaceable. Thus, in some implementations, for each use, a user may change the lower cap 108 and/or the seal 116 to ensure proper sealing between the lower cap 108 and the encapsulator 202 of the puncture assembly 200.

In some implementations, the puncture device 218 may include a sharp end for contacting and causing a breakage in the oil filter 102 to allow for draining the oil. The puncture device 218 can include a drill bit, sharpened metal, step bit, center punch, nail, screw, or combinations thereof. In some implementations, a rotation method for applying pressure to cause the oil filter 102 to be punctured may be used, especially if a drill bit or step bit is used.

In some implementations, the spring is positioned inside or internal to the encapsulator 202 to urge the handle bar 208b to return to its original position after being pushed up by a user. In some implementations, the handle shaft 208a also includes the handle flange 208c located between the handle shaft 208a and the handle bar 208b. When assembled, the handle flange 208c is positioned within the encapsulator 202 to prevent the handle shaft 208a from falling out of the encapsulator 202.

Figure 3A:
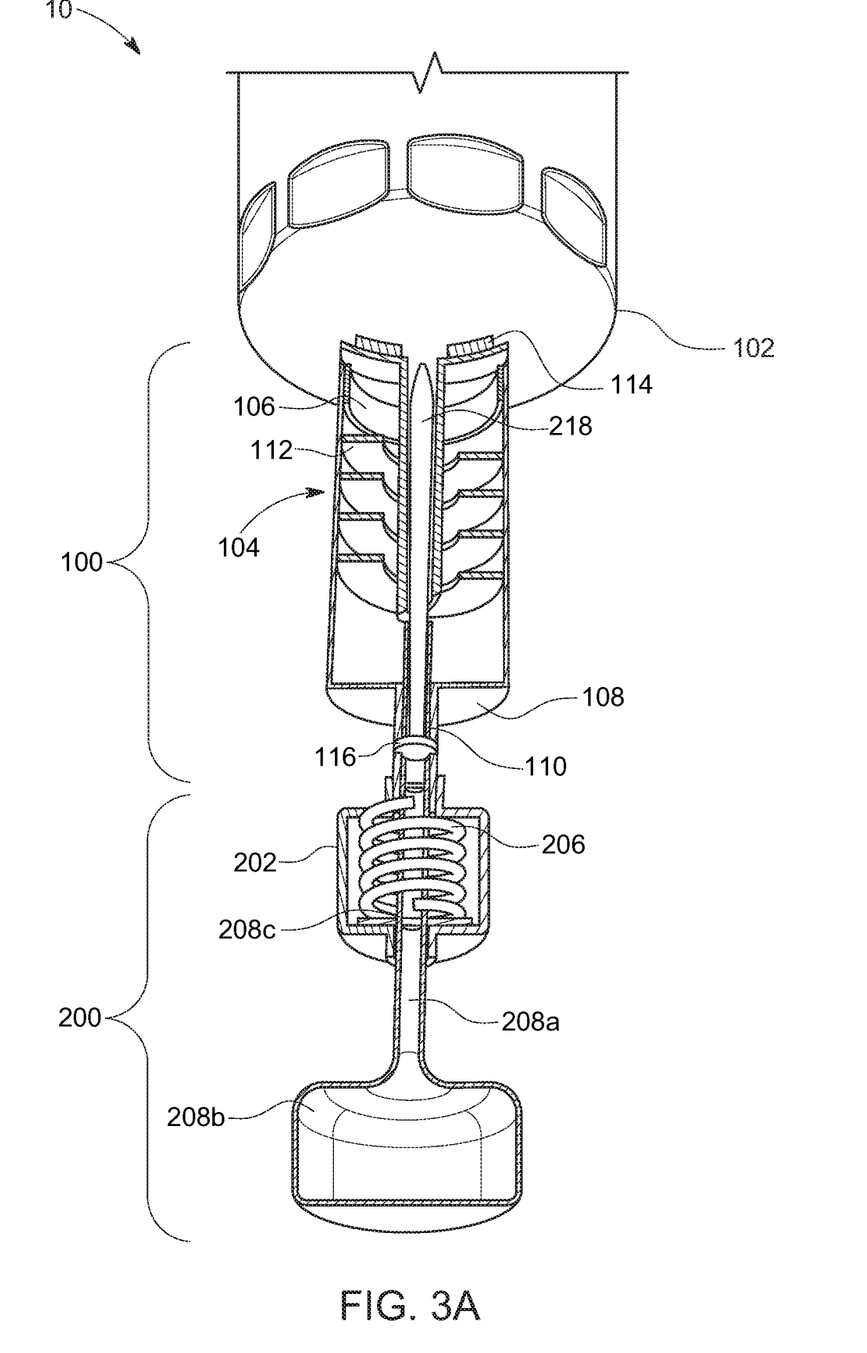
FIG. 3A illustrates a cross-sectional view of the system of FIG. 1 in a first position, according to some implementations of the present disclosure.

Referring to FIG. 3A, a first position (e.g., pre-puncture) in the process of using the system 10 for removing and/or draining oil is depicted. The system 10 in FIG. 3A is the same as, or similar to, the system 10 in FIGS. 1-2, where identical reference numbers refer to identical components. The containment device 100 is coupled to the oil filter 102, with the gasket 114 in-between. The containment device 100 is also coupled to the puncture assembly 200, at the first position, where the spring 206 is not compressed. In the example shown in FIG. 3A, at least a portion of the handle shaft 208a is encapsulated by the encapsulator 202.

Figure 3B:
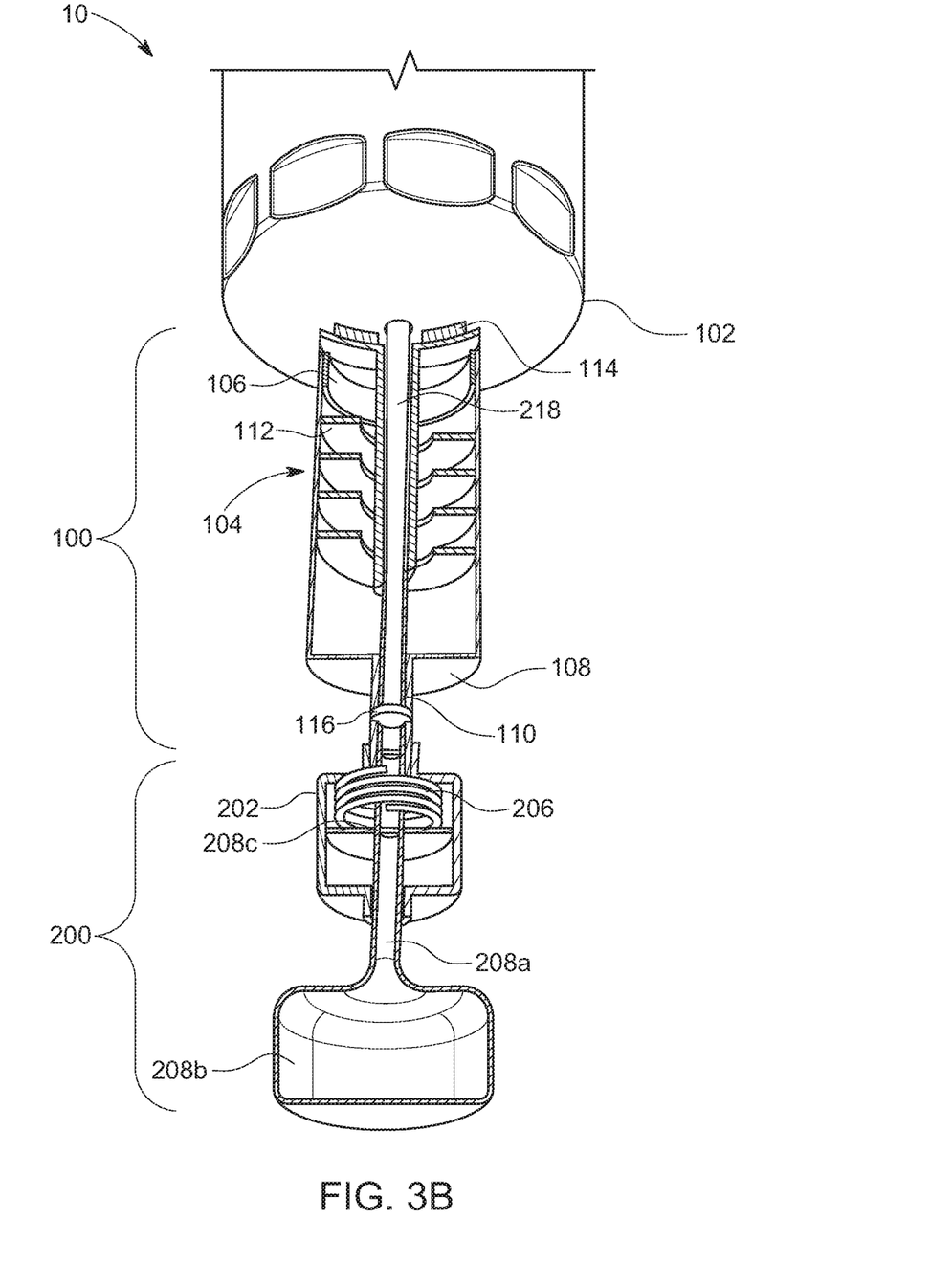
FIG. 3B illustrates a cross-sectional view of the system of FIG. 1 in a second position, according to some implementations of the present disclosure.

Referring to FIG. 3B, a second position (e.g., during puncture) in the process of using the system 10 for removing and/or draining oil is depicted. The system 10 in FIG. 3B is the same as, or similar to, the system 10 in FIGS. 1-3A, where identical reference numbers refer to identical components. As pressure is applied to the handle bar 208b, the length of handle shaft 208a may be moved farther into the interior of the encapsulator 202, such that the length of the puncture device 218 is moved inside the housing 104. As a result, the puncture device 218 punctures and/or extends through the oil filter 102.

In some implementations, the spring 206 compresses during this process in order to absorb any vibrations in the application or release of pressure on the handle bar 208b. In some implementations, the compression of the spring 206 is due to the handle flange 208c applying pressure in a direction toward the oil filter 102. Thus, the configuration (as shown in FIG. 3B) biases the spring 206 against an internal surface of the encapsulator 202, thereby urging the spring 206 to compress.

Figure 3C:
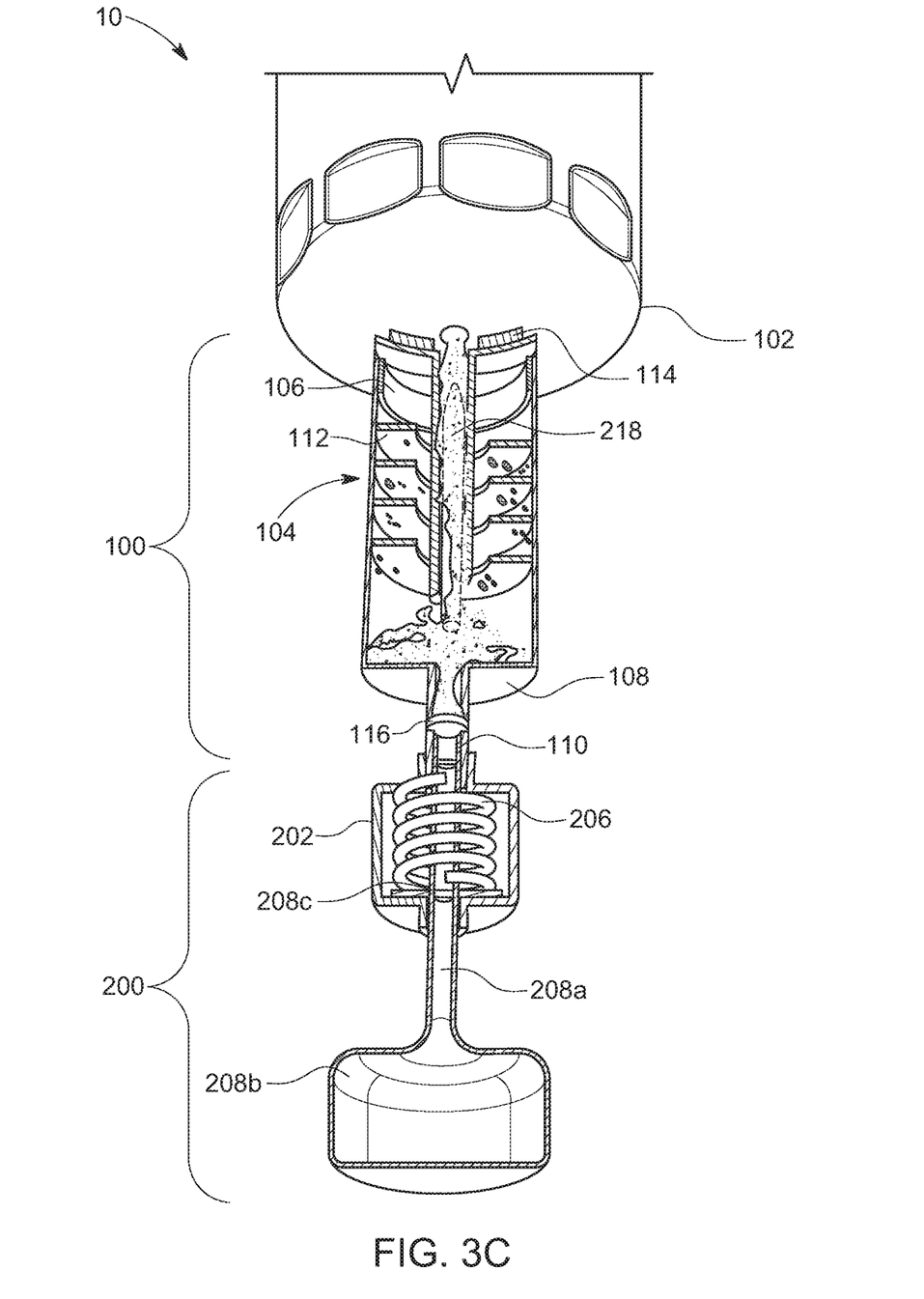
FIG. 3C illustrates a cross-sectional view of the system of FIG. 1 in a third position, according to some implementations of the present disclosure.

Referring to FIG. 3C, a third position (e.g., post-puncture) in the process of using the system 10 for removing and/or draining oil is depicted. The system 10 in FIG. 3C is the same as, or similar to, the system 10 in FIGS. 1-3B, where identical reference numbers refer to identical components. Pressure on the handle bar 208b may be released after sufficient pressure is applied such that the oil filter 102 is punctured (FIG. 3B). In some implementations, the spring 206 urges the handle bar 208b to return to its pre-puncture position (e.g., FIG. 3A), which is the same as the post-puncture position (FIG. 3C). Additionally, or alternatively, the spring 206 returns to a relaxed position and absorbs any resulting vibrations form the release of pressure to the handle bar 208b.

After the puncture device 218 punctures the oil filter 102 and/or the puncture device 218 is moved out of the oil filter 102, oil may flow from the oil filter 102 into the housing 104 of the containment device 100. In some implementations, the spiral support 112 may also aid and/or direct the oil to move to the bottom portion of the housing 104. In some implementations, the spiral support 112 may enhance the flow of oil from the oil filter 102 due to a created pump from the pressure of the spiral support 112.

In some implementations, an automated system may be used for applying pressure to the puncture device 218. In some such implementations, the handle shaft 208a and handle bar 208b may be replaced with a mechanism that automatically induces the puncture device 218 to apply pressure to the oil filter 102. The automated mechanism may be activated using a handheld device coupled to an actuator. For example, in some implementations, instead of the handle shaft 208a and/or the handle bar 208b, the puncture assembly 200 may include a hydraulic actuator, a pneumatic actuator, an electric actuator, a mechanical actuator, or any combination thereof.

While the containment device 100 is depicted in FIGS. 1-3C as including the housing 104, the upper cap 106, the lower cap 108, the inner shaft 110, the spiral support 112, the gasket 114, and the seal 116, a containment device of the present disclosure can include more or fewer components. For example, FIG. 4 illustrates the first alternative containment device 400.

While the puncture assembly 200 is depicted in FIGS. 1-3C as including the encapsulator 202, the spring 206, the handle shaft 208a, and the handle bar 208b, the puncture assembly 200 can include more or fewer components. For example, a first alternative puncture assembly can include the encapsulator 202, the spring 206, the handle shaft 208a, an ergonomic handle bar, and the handle flange 208c. In some such implementations, the ergonomic handle bar may include being shaped as the negative extrusion of a gripped hand on the handle bar, for use with the push-button method. In some such implementations, the ergonomic handle bar may be engulfed by gel sleeve. As another example, a second alternative puncture assembly can include the encapsulator 202, a memory foam insert, the handle shaft 208a, the handle bar 208b, and the handle flange 208c. In some such implementations, the memory foam insert takes the place of the spring in absorbing the shock from the system when the pressure is released.

Referring to FIG. 4, a cross-sectional view of another example system 40 is depicted, according to some implementations of the present disclosure. The system 40 is the same as, or similar to, the system 10 as shown in FIGS. 1-3C, where like reference numbers refer to like components. As shown, the housing 404 of the containment device 400 may include a top rim 420, an upper portion 422, a lower portion 424, and a bottom rim 426. The top rim 420 of the housing 404 includes a first diameter. The bottom rim 426 of the housing 404 has a second diameter that is less than the first diameter of the top rim 420. In some implementations, the upper portion 422 of the housing 104 may define a taper 425 toward the lower portion 424 of the housing 104. For example, in some implementations, the upper portion 422 of the housing 404 may include a length L of five inches with a two-inch diameter, before the taper 425 begins.

Figure 5:
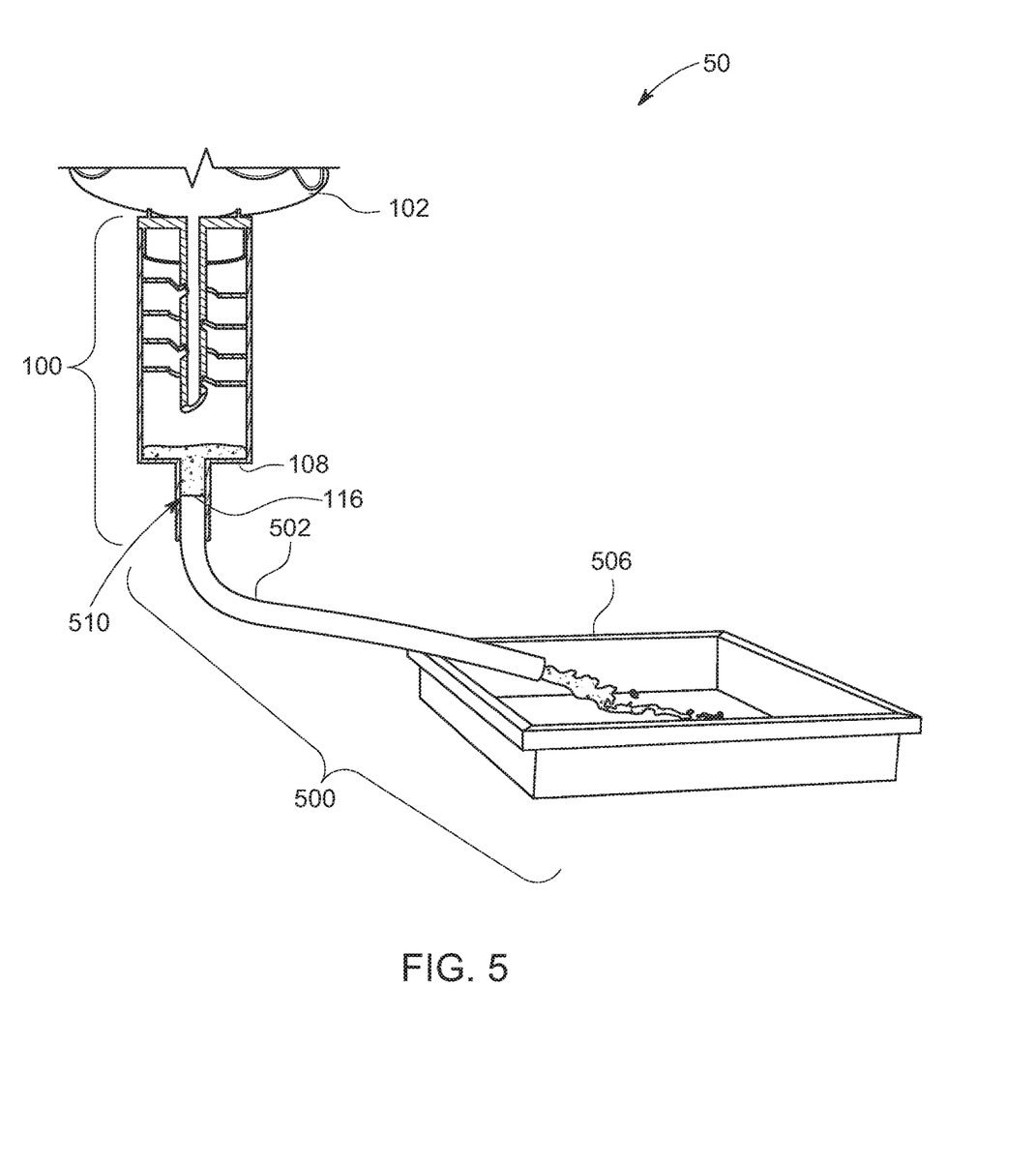
FIG. 5 illustrates a subsequent implementation of the system of FIG. 1 in a third position, according to some implementations of the present disclosure.

Referring now to FIG. 5, an example oil draining system 50 is depicted. The system 50 is the same as, or similar to, the system 10 in FIG. 1, except that the puncture assembly 200 is replaced by the drain assembly 500. In some implementations, the drain assembly 500 may be viewed as a subsequent implementation after FIG. 3B. As such, in some implementations, the drain assembly 500 may be used in the system 10 (FIG. 1) for removing and/or draining oil.

The drain assembly 500 is removably coupled to the containment device 100. Thus, in some implementations, the puncture assembly 200 (FIG. 1) is decoupled from the containment device 100, and the drain assembly 500 is then removably coupled to the containment device 100. This connection between the drain assembly 500 and the containment device 100 is sealed to avoid unnecessary burns or mess due to potential spilling or leaking of oil. The connection between the drain assembly 500 and the containment device 100 may be made using threads, seals, gaskets, or any other mechanism that ensures a removable connection and/or good sealing.

In some implementations, the drain assembly 500 can include a tube 502 and a clip 504. The tube 502 may be used as a controlled attachment to guide oil into a catch pan 506. In some implementations, the tube 502 may have an outer diameter of $\frac{7}{16}$ inch. In some implementations, the tube 502 may include a length of 10 inches. In some implementations, the tube 502 may be hollow. In some implementations, the tube 502 is removably coupled to the lower cap 108 of the containment device 100.

The tube 502 may also include an end 510 going into the containment device 100 to ensure oil flow. The end 510 of the tube 502 may include a metal tip in instances where the tube 502 punctures the seal 116 of the lower cap 108. Upon applying pressure to the containment device 100, the oil is released into the drain assembly 500, beginning with the tube 502. The tube 502 may, therefore, be positioned to ensure the removed and/or drained oil is controlled or contained in the catch pan 506. The oil may be handled from the catch pan 506 once fully removed and/or drained from the system 10 for removing and/or draining oil.

Thus, in some implementations, the seal 116 of the lower cap 108 can be reused for at least four times, allowing (i) coupling and decoupling of the puncture assembly 200, and (ii) coupling and decoupling of the tube 502. Further, in some implementations, the tube 502 may include a clip to resist the flow of the oil out of the tube 502, while the clip is attached to the tube 502. Thus, the clip is not depicted in FIG. 5 where the oil flows out of the tube 502.

In some implementations, an oil removal kit includes a containment device (e.g., the containment device 100 or the containment device 400), a puncture assembly (e.g., the puncture assembly 200), and a drain assembly (e.g., the drain assembly 500). In some implementations, the containment device 100 is coupled to an oil filter 102. The puncture assembly 200 is attached to the containment device 100, opposite the oil filter 102. The puncture device 218 of the puncture assembly 200 punctures the oil filter 102, such that oil may flow from the oil filter 102 into a housing 104 of the containment device 100 (FIGS. 3B-3C). Once the oil has been transferred from the oil filter 102 and into the housing 104 of the containment device 100, the puncture assembly 200 may be disconnected from the containment device 100. Then, the drain assembly 500 may be attached to the containment device 100 (FIG. 5). Once pressure is applied by the tube 502 and/or a rigid end (e.g., the end is sharp or merely more rigid than the seal 116 of the lower cap 108) of the drain assembly 500, the oil flows from the containment device 100 into the drain assembly 500. In some implementations, the oil flows directly into the catch pan 506. Once the oil is completely removed and/or drained from the containment device 100 and into the catch pan 506, a user may dispose of the oil as desired.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system for removing oil from an oil filter of a motor vehicle, the system comprising:
    a housing defining a top rim, an upper portion, a lower portion, and a bottom rim, the top rim having a first diameter, the bottom rim having a second diameter that is less than the first diameter;
    an upper cap including a flange with a first side and an opposing second side, the flange being disposed at a top portion of the upper cap, the first side of the flange being coupled to the top rim of the housing, the second side of the flange being couplable to the oil filter, a bottom portion of the upper cap extending into the housing, the upper cap including a central aperture for draining the oil from the oil filter into the housing;
    a lower cap coupled to the bottom rim of the housing; and
    a puncture device removably coupled to the lower cap, at least a portion of the puncture device extending through the lower cap into a void of the upper cap.

2. The system of claim 1, wherein the upper portion of the housing defines a taper from the top rim toward the lower portion of the housing, and wherein the lower portion of the housing is generally cylindrical.

3. The system of claim 1, wherein the upper portion of the housing includes a hollow conical frustrum, wherein the lower portion of the housing includes a hollow cylinder with open ends, and wherein the hollow cylinder extends below the conical frustrum of the upper portion of the housing.

4. The system of claim 1, wherein the second side of the upper cap is concave for directing the oil from the oil filter toward the central aperture of the upper cap.

5. The system of claim 1, wherein the at least a portion of the puncture device includes a drill bit.

6. The system of claim 1, wherein the lower cap includes an internal seal, and wherein the puncture device is configured to penetrate the internal seal of the lower cap and extend into the housing while substantially being leak-proof between the puncture device and the internal seal of the lower cap.

7. The system of claim 1, wherein the puncture device is configured to extend further through the upper cap and out of the second side of the upper cap.

8. The system of claim 1, wherein the lower portion of the housing includes a third diameter that is equal to the second diameter of the bottom rim.

9. The system of claim 1, wherein a longitudinal cross-section of the upper cap is generally "T" shaped.

10. The system of claim 9, wherein a transverse cross-section of the upper cap is generally "O" shaped.

11. The system of claim 1, further comprising a gasket with a first side and an opposing second side, the first side of the gasket being coupled to the second side of the upper cap and the second side of the gasket being couplable to the oil filter.

12. The system of claim 11, wherein the gasket is substantially circular.

13. A system for removing oil from an oil filter of a motor vehicle, the system comprising:
    a housing defining a top rim, an upper portion, a lower portion, and a bottom rim, the top rim having a first diameter, the bottom rim having a second diameter that is less than the first diameter;
    an upper cap including a flange with a first side and an opposing second side, the flange being disposed at a top portion of the upper cap, the first side of the flange being coupled to the top rim of the housing, the second side of the flange being couplable to the oil filter, a bottom portion of the upper cap extending into the housing, the upper cap including a central aperture for draining the oil from the oil filter into the housing;
    a lower cap coupled to the bottom rim of the housing; and
    a hollow tube removably coupled to the lower cap, the hollow tube including a proximal tip for puncturing the lower cap, thereby allowing removal of the oil from the oil filter.

14. The system of claim 13, wherein the hollow tube includes a puncture device at a proximal end of the hollow tube, the puncture device being configured to extend through the lower cap.

15. A system for removing oil from an oil filter of a motor vehicle, the system comprising:
- a housing defining a top rim, a body portion, and a bottom rim, the body portion of the housing being generally cylindrical;
- an upper cap including a flange with a first side and an opposing second side, the flange being disposed at a top portion of the upper cap, the first side of the flange being coupled to the top rim of the housing, the second side of the flange being couplable to the oil filter, a bottom portion of the upper cap extending into the housing, the upper cap including a central aperture for draining the oil from the oil filter into the housing;
- a lower cap coupled to the bottom rim of the housing; and
- a puncture device removably coupled to the lower cap, at least a portion of the puncture device extending through the lower cap into a void of the upper cap.

16. The system of claim 15, wherein the second side of the upper cap is concave for directing the oil from the oil filter toward the central aperture of the upper cap.

17. A system for removing oil from an oil filter of a motor vehicle, the system comprising:
- a housing defining a top rim, a body portion, and a bottom rim, the body portion of the housing being generally cylindrical;
- an upper cap including a flange with a first side and an opposing second side, the flange being disposed at a top portion of the upper cap, the first side of the flange being coupled to the top rim of the housing, the second side of the flange being couplable to the oil filter, a bottom portion of the upper cap extending into the housing, the upper cap including a central aperture for draining the oil from the oil filter into the housing;
- a lower cap coupled to the bottom rim of the housing; and
- a hollow tube removably coupled to the lower cap, the hollow tube including a proximal tip for puncturing the lower cap, thereby allowing removal of the oil from the oil filter.

\* \* \* \* \*